US012670024B2

(12) United States Patent (10) Patent No.: US 12,670,024 B2
Zhu et al. (45) Date of Patent: Jun. 30, 2026

(54) PARALLEL METHOD AND DEVICE FOR CONVOLUTION COMPUTATION AND DATA LOADING OF NEURAL NETWORK ACCELERATOR

(71) Applicants: Zhejiang Lab, Zhejiang (CN); ZHEJIANG UNIVERSITY, Zhejiang (CN)

(72) Inventors: Guoquan Zhu, Zhejiang (CN); De Ma, Zhejiang (CN); Qiming Lu, Zhejiang (CN); Junhai Fan, Zhejiang (CN); Fangchao Yang, Zhejiang (CN); Xiaofei Jin, Zhejiang (CN); Shichun Sun, Zhejiang (CN); Youneng Hu, Zhejiang (CN)

(73) Assignees: Zhejiang Lab, Zhejiang (CN); ZHEJIANG UNIVERSITY, Zhejiang (CN)

( * ) Notice: Subject to any disclaimer, the term of this patent is extended or adjusted under 35 U.S.C. 154(b) by 1081 days.

(21) Appl. No.: 17/745,830

(22) Filed: May 16, 2022

(65) Prior Publication Data

US 2022/0414423 A1 Dec. 29, 2022

(30) Foreign Application Priority Data

Jun. 25, 2021 (CN) .......................... 202110707419.0

(51) Int. Cl.
*G06F 9/50* (2006.01)
*G06F 9/46* (2006.01)
(Continued)

(52) U.S. Cl.
CPC .......... *G06F 9/5016* (2013.01); *G06F 9/5027* (2013.01); *G06F 9/5066* (2013.01); *G06F 17/153* (2013.01); *G06F 9/462* (2013.01);

*G06F 9/5038* (2013.01); *G06F 15/781* (2013.01); *G06F 15/7817* (2013.01); (Continued)

(58) Field of Classification Search
CPC .... G06F 9/5016; G06F 9/5027; G06F 9/5066; G06F 17/153; G06F 9/462; G06F 9/5038; G06F 2209/509; G06F 15/781; G06F 15/7817; G06N 3/0464; G06N 3/0495; G06N 3/063; G06N 3/045
See application file for complete search history.

(56) References Cited

U.S. PATENT DOCUMENTS

2015/0178246 A1\* 6/2015 Herrero Abellanas ......................
G06N 3/063
708/300
2020/0293379 A1\* 9/2020 Zhang ................... G06N 3/0464
(Continued)

OTHER PUBLICATIONS

"Types of Convolution Kernels: Simplified". Available at https://towardsdatascience.com/types-of-convolution-kernels-simplified-f040cb307c37/. Available on Oct. 18, 2019 (Year: 2019).\*

*Primary Examiner* — Michael W Ayers
(74) *Attorney, Agent, or Firm* — JCIPRNET

(57) ABSTRACT

Disclosed are a parallel method and device for convolution computation and data loading of a neural network accelerator. The method needs two input feature maps and two convolution kernel cache blocks, and sequentially stores the input feature maps and 64 convolution kernels into cache sub-blocks according to a loading length, so as to execute convolution computation and simultaneously load data of a next group of 64 convolution kernels.

8 Claims, 5 Drawing Sheets

(51) Int. Cl.

| | |
|---|---|
| *G06F 15/78* | (2006.01) |
| *G06F 17/15* | (2006.01) |
| *G06N 3/045* | (2023.01) |
| *G06N 3/0464* | (2023.01) |
| *G06N 3/0495* | (2023.01) |
| *G06N 3/063* | (2023.01) |

(52) U.S. Cl.
CPC ........ *G06F 2209/509* (2013.01); *G06N 3/045* (2023.01); *G06N 3/0464* (2023.01); *G06N 3/0495* (2023.01); *G06N 3/063* (2013.01)

(56)     References Cited

U.S. PATENT DOCUMENTS

2020/0380337 A1 *  12/2020  Shan ...................... G06F 11/079
2023/0306588 A1 *   9/2023  Fan ........................... G06T 7/11

\* cited by examiner

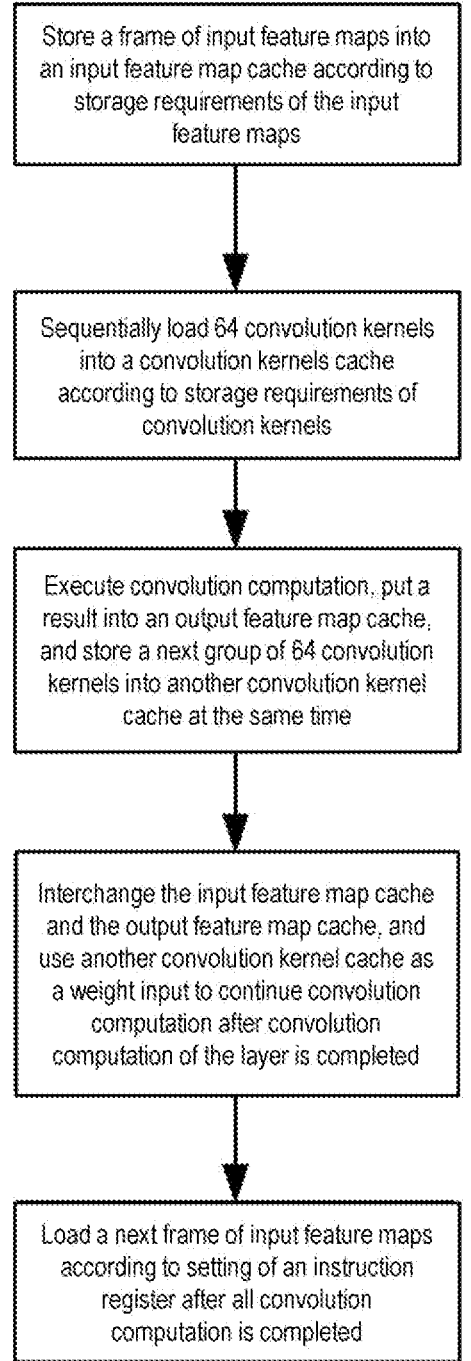

Store a frame of input feature maps into an input feature map cache according to storage requirements of the input feature maps Sequentially load 64 convolution kernels into a convolution kernels cache according to storage requirements of convolution kernels Execute convolution computation, put a result into an output feature map cache, and store a next group of 64 convolution kernels into another convolution kernel cache at the same time Interchange the input feature map cache and the output feature map cache, and use another convolution kernel cache as a weight input to continue convolution computation after convolution computation of the layer is completed Load a next frame of input feature maps according to setting of an instruction register after all convolution computation is completed

FIG. 2

PARALLEL METHOD AND DEVICE FOR CONVOLUTION COMPUTATION AND DATA LOADING OF NEURAL NETWORK ACCELERATOR

CROSS-REFERENCE TO RELATED APPLICATION

This application claims the priority benefit of China application no. 202110707419.0, filed on Jun. 25, 2021. The entirety of the above-mentioned patent application is hereby incorporated by reference herein and made a part of this specification.

BACKGROUND

Technical Field

The present disclosure relates to the field of neural network computation, and in particular to a parallel method and device for convolution computation and data loading of a neural network accelerator.

Description of Related Art

The neural network has become a research hotspot in academia and industry as soon as the neural network appeared. As the research continues deepening, various of neural networks, including large networks with hundreds of layers of depths and thousands of parameters, have been proposed. Presently, the main research work is completed by a graphics processor (GPU). The GPU has simple operation and convenient programming, has inherent advantages for training a neural network, but at the same time, also has disadvantages: in the aspect of executing some reasoning applications, especially mass terminal deployment, the GPU consumes huge power and has high cost.

In March, 2016, Google alphago defeated Li Shishi, the world champion of go and a professional nine dan chess player. Since then, research on neural network accelerators has sprung up, and various neural network accelerators having novel architectures came into being.

Generally speaking, the neural network accelerator mainly includes a data input/output cache unit, a convolution computation unit, a quantization unit, a vector computation unit, a pooling unit, etc., in which the modules are relatively independent and interrelated. The prior art generally prepares the input feature map and convolution kernel weight in advance, computes convolution according to the convolution instruction to output the result, and then continues preparing the input feature map and the convolution kernel weight to compute convolution, etc. The prior art has simple, direct and easily understood principles, but does not fully consider parallelism between various operations, which makes the reasoning time of large-scale neural networks too long. Especially for the target detection neural networks having high real-time requirements, the poor real-time performance will cause missed detection of the networks, seriously affecting the performance. Moreover, due to the lack of parallelism in the prior art, a large number of convolution kernels need to be stored on the chip in order to ensure normal computation, such that the on-chip convolution kernel cache is large, increasing the area of the chip and increasing the cost.

Therefore, a parallel method for convolution computation and data loading of a neural network accelerator is required.

SUMMARY

In order to overcome the defects in the prior art and achieve the purposes of improving computation efficiency of a neural network and reducing cost, the present disclosure uses the following technical solution:

a parallel method for convolution computation and data loading of a neural network accelerator includes:

S1, storing a frame of input feature map into an input feature map cache, and dispersedly storing the input feature maps into input feature map sub-caches according to channels of the input feature maps;

S2, sequentially loading a group of convolution kernels into corresponding convolution kernel cache sub-blocks in a first convolution kernel cache;

S3, loading the input feature map cache and the first convolution kernel cache to execute convolution computation, putting a result into an output feature map cache, and storing a next group of convolution kernels into corresponding convolution kernel cache sub-blocks in a second convolution kernel cache, which includes:

S31, loading an input feature map instruction parameter latch, loading a convolution kernel instruction parameter latch, and under the condition that a current instruction is an input feature map loading instruction, latching an off-chip input feature map storage address and loading an input feature map length; and latching the number of currently loaded convolution kernels, lengths of the loaded convolution kernels, a convolution kernel cache starting address and an off-chip convolution kernel storage address under the condition that the current instruction is a convolution kernel loading instruction;

S32, comparing the number of the convolution kernels, and under the condition that the total number of the convolution kernels is greater than a latch value of the number of the loaded convolution kernels and is an integer multiple of the number of the loaded convolution kernels greater than 1 in a convolution computation instruction, computing convolution and synchronously loading convolution kernels, the number of channels of the convolution kernels being the number of the loaded convolution kernels; under the condition that the total number of the convolution kernels is greater than the latch value of the number of the loaded convolution kernels and is 1 multiple of the number of the loaded convolution kernels in the convolution computation instruction, computing convolution and synchronously loading convolution kernels, the number of channels of the convolution kernels being a difference value between the total number of the convolution kernels and the latch value of the number of the loaded convolution kernels; and determining whether to load convolution kernels in the next layer according to setting in the convolution computation instruction under the condition that the total number of the convolution kernels is equal to the latch value of the number of the loaded convolution kernels in the convolution computation instruction; and S33, setting a loading flag according to a comparison result of the number of the convolution kernels, the loading lag representing that data is specifically loaded into which convolution kernel cache, and setting a convolution computation starting flag;

S34, synchronously carrying out convolution computa-
tion and data loading which are independent of each
other; and S35, computing the number of remaining convolution
kernels after convolution computation and data loading
are completed, latching data loading parameters of the
convolution kernels in S34, and returning S32 to con-
tinue being executed until convolution computation is
completed;

S4, after convolution computation of the layer is com-
pleted, interchanging the input feature map cache and
the output feature map cache, and using a convolution
kernel cache storing an effective weight as the first
convolution kernel cache to execute S3; and S5, determining that all convolution computation is com-
pleted.

Further, the number of the remaining convolution kernels
is computed after a convolution computation completion
flag and a data loading completion flag are valid at the same
time in S35.

Further, in S4, the effective weight is stored into the
convolution kernel cache, which convolution kernel cache
stores the effective weight is determined according to the
number of the convolution kernels of each of convolution
layers and initial storage positions of the convolution ker-
nels, which includes:

S41, under the condition that the initial storage positions
of the convolution kernels in S2 are set as the first
convolution kernel cache;

S42, using the second convolution kernel cache for next
convolution computation under the condition that the
total number of the convolution kernels is within the
number of columns of a convolution computation
array;

S43, using the first convolution kernel cache for next
convolution computation under the condition that the
total number of the convolution kernels is an even
multiple of the number of columns of the convolution
computation array;

S44, using the second convolution kernel cache for next
convolution computation under the condition that the
total number of the convolution kernels is an odd
multiple of the number of columns of the convolution
computation array; and S45, dividing the total number of the convolution kernels
by the number of columns of the convolution compu-
tation array to round up to an integer under the condi-
tion that the total number of the convolution kernels is
not the even multiple or the odd multiple of the number
of columns of the convolution computation array, the initial storage positions are the second convolution
kernel cache, the steps being the same, and a result
being opposite.

Further, the effective weight is stored into the convolution
kernel cache and is directly given by means of fields in the
convolution computation instruction in S4.

Further, the channels of the input feature maps are sequen-
tially and circularly stored into sequences corresponding to
sub-caches in order in S 1.

Further, the sub-cache is expanded to make the plurality
of sub-caches store one channel when a single feature map
sub-cache is not enough to store a feature map of a single
channel in S1.

Further, lengths of the convolution kernel cache sub-
blocks are W×H×C in S2, W representing widths of the
convolution kernels, H representing heights of the convolution kernels, and C representing the number of the chan-
nels of each of the input feature maps.

Further, a next frame of input feature map is loaded,
and/or convolution kernels in the next layer are loaded after
all convolution computation is completed in S5.

A parallel device for convolution computation and data
loading of a neural network accelerator includes: a convo-
lution computation array, and an input feature map cache, an
output feature map cache and a convolution kernel cache
which are each connected to the convolution computation
array, where the convolution kernel cache includes a first
convolution kernel cache and a second convolution kernel
cache;

the input feature map cache and the output feature map
cache are consistent in structure, and a frame of input
feature map is stored into the input feature map cache,
and are dispersedly stored into input feature map sub-
caches according to channels of the input feature maps;

the first convolution kernel cache and the second convo-
lution kernel cache are consistent in structure, and a
group of convolution kernels are sequentially loaded
into corresponding convolution kernel cache sub-
blocks in the first convolution kernel cache; and the convolution computation array is composed of a
two-dimensional array, the input feature map cache and
the first convolution kernel cache are loaded to execute
convolution computation, a result is put into the output
feature map cache, and moreover, a next group of
convolution kernels are stored into corresponding con-
volution kernel cache sub-blocks in the second convo-
lution kernel cache; and after convolution computation
of the layer is completed, the input feature map cache
and the output feature map cache are interchanged, and
a convolution kernel cache storing an effective weight
is used as the first convolution kernel cache to continue
convolution computation until all convolution compu-
tation is completed.

The Present Disclosure has the Advantages and Beneficial
Effects:

the parallel method and device for convolution computa-
tion and data loading of a neural network accelerator
provided in the present disclosure make convolution
computation and data loading completely parallel, and
hides part of the convolution kernels and loading time
of the next frame of input feature map, thereby greatly
reducing total reasoning time of the neural network
accelerator, and improving efficiency and real-time
performance of the neural network accelerator; the
parallel method may remarkably reduce space of the
on-chip convolution kernel cache, thereby reducing an
area of a chip, and reducing manufacturing cost of the
chip; and moreover, the parallel method has simple
implementation, may match most existing neural net-
works, and is irrelevant to the specific number of layers
of the neural network.

BRIEF DESCRIPTION OF THE DRAWINGS

FIG. 2 is a method flow chart of the present disclosure.

DESCRIPTION OF THE EMBODIMENTS

The specific implementation of the present disclosure is described in detail below in conjunction with the drawings. It should be understood that the specific implementation described herein is merely illustrative of the present disclosure and is not intended to limit the present disclosure.

Figure 1:
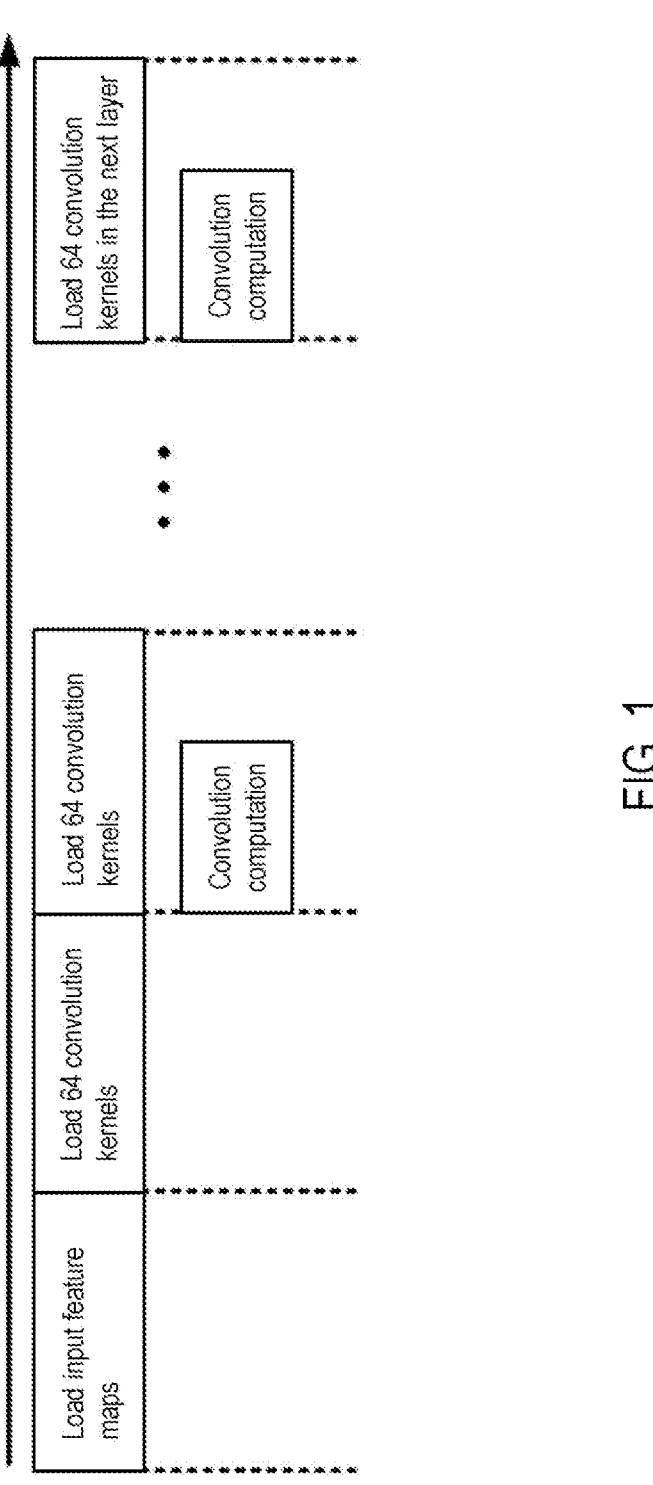
FIG. 1 is a solution schematic diagram of the present
disclosure.

As shown in FIG. 1, a parallel solution for convolution computation and data loading of a neural network accelerator includes: load input feature maps, load 64 convolution kernels, carry out loading and convolution computation on the 64 convolution kernels, and carry out loading and convolution computation on 64 convolution kernels in the next layer.

The loading input feature maps includes all input feature map channels used for convolution computation; the loading 64 convolution kernels not only includes a condition that 64 convolution kernels are loaded, but also includes a condition that the total number of loaded convolution kernels is less than 64; the carrying out loading and convolution computation on the 64 convolution kernels includes parallel operation of loading and convolution computation of the 64 convolution kernels, where time of loading the 64 convolution kernels is slightly longer than time of convolution computation under a general condition, and is possibly shorten than time of convolution computation, which is related to a specific network structure and convolution parameters of each of layers; and the carrying out loading and convolution computation on 64 convolution kernels in the next layer not only includes a condition of loading and convolution computation of the 64 convolution kernels in the next layer, but also includes a condition of loading and convolution computation of a next frame of input feature map. As shown in FIG. 2, a parallel method includes:

step 1, completely store a frame of input feature map into an input feature map cache according to storage requirements of the input feature maps.

Figure 3:
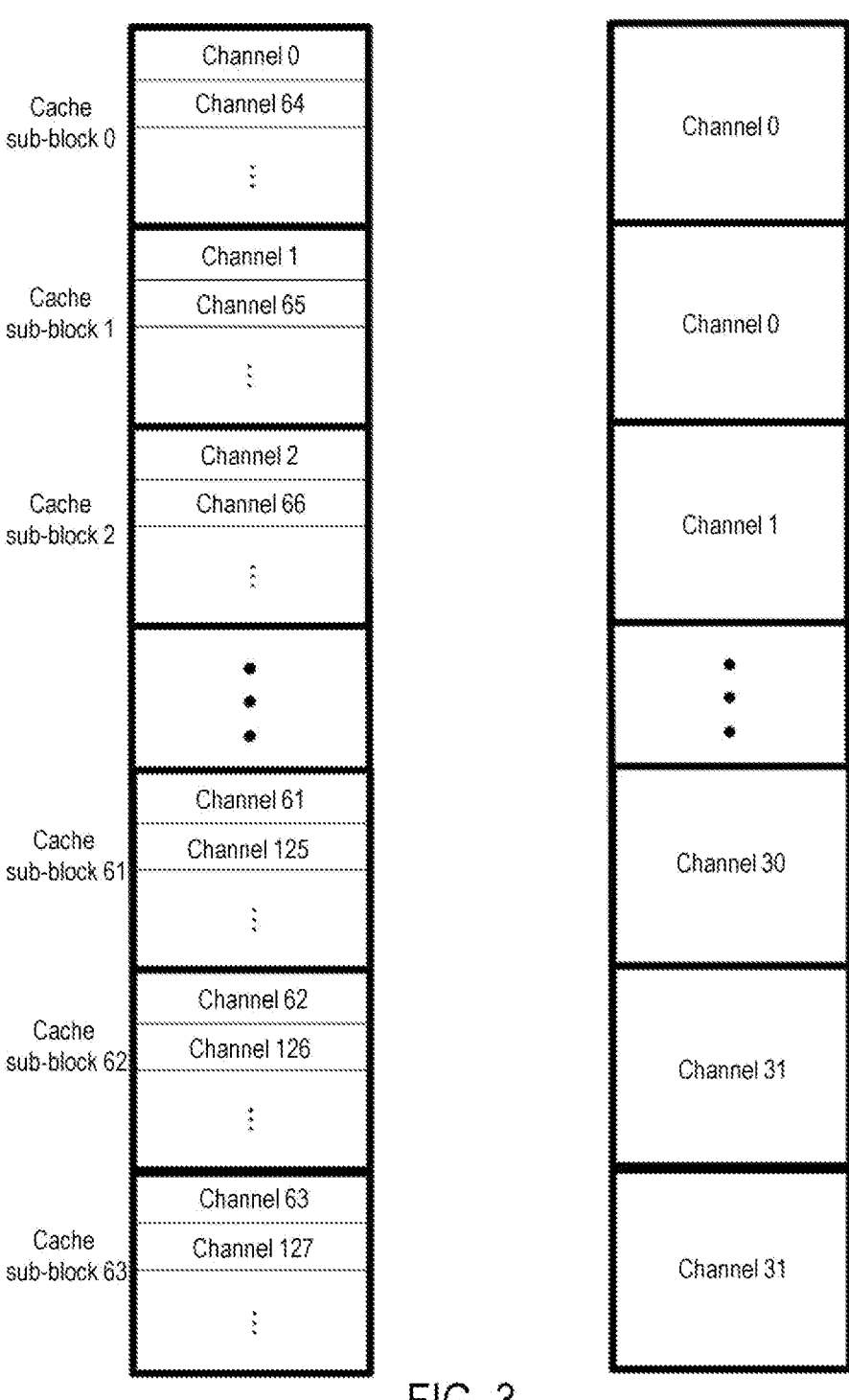
FIG. 3 is a storage format chart of an input feature map
and an output feature map in an input feature map cache and
an output feature map cache respectively in the present
disclosure.

As shown in FIG. 3, the input feature map cache and an output feature map cache are each divided into 64 blocks, including an input-output non-expansion condition on a left side and an input-output expansion condition on a right side.

For the input-output non-expansion condition, if the input feature maps are 52×52×128, and 52, 52 and 128 correspond to lengths of the input feature maps, widths of the input feature maps and the number of channels of each of the input feature maps respectively, channel 1 is stored into channel 0 of cache sub-block 0, channel 2 is stored into channel 1 of cache sub-block 1 until channel 64 is stored into channel 63 of cache sub-block 63, and then channel 65 is stored into channel 64 of cache sub-block 0 until channel 128 is stored into channel 127 of cache sub-block 63.

For the input-output expansion condition, if the input feature maps are 416×416×32, and 416, 416 and 32 corresponding to lengths of the input feature maps, widths of the input feature maps and the number of channels of each of the input feature maps respectively, when a single cache is not enough to store the 416×416 feature map, the input feature map cache needs to be expanded, that is, channel 1 is stored into cache sub-block 0 and cache sub-block 1, and channel

2 is stored into cache sub-block 2 and cache sub-block 3 until channel 32 is stored into cache sub-block 62 and cache sub-block 63.

Step 2, sequentially load the 64 convolution kernels into a convolution kernel cache according to storage requirements of the convolution kernels; and equally divide a convolution kernel weight cache into 64 cache sub-blocks. If the input feature maps are 208× 208×64, 208, 208 and 64 correspond to lengths of the input feature maps, widths of the input feature maps and the number of channels of each of the input feature maps respectively, the convolution kernels are 3×3× 64×128, and 3, 3, 64 and 128 correspond to lengths of the convolution kernels, widths of the convolution kernels, the number of channels of the convolution kernels and the total number of the convolution kernels, each of the cache sub-blocks should be stored into 576 (3×3×64) values.

Figure 4:
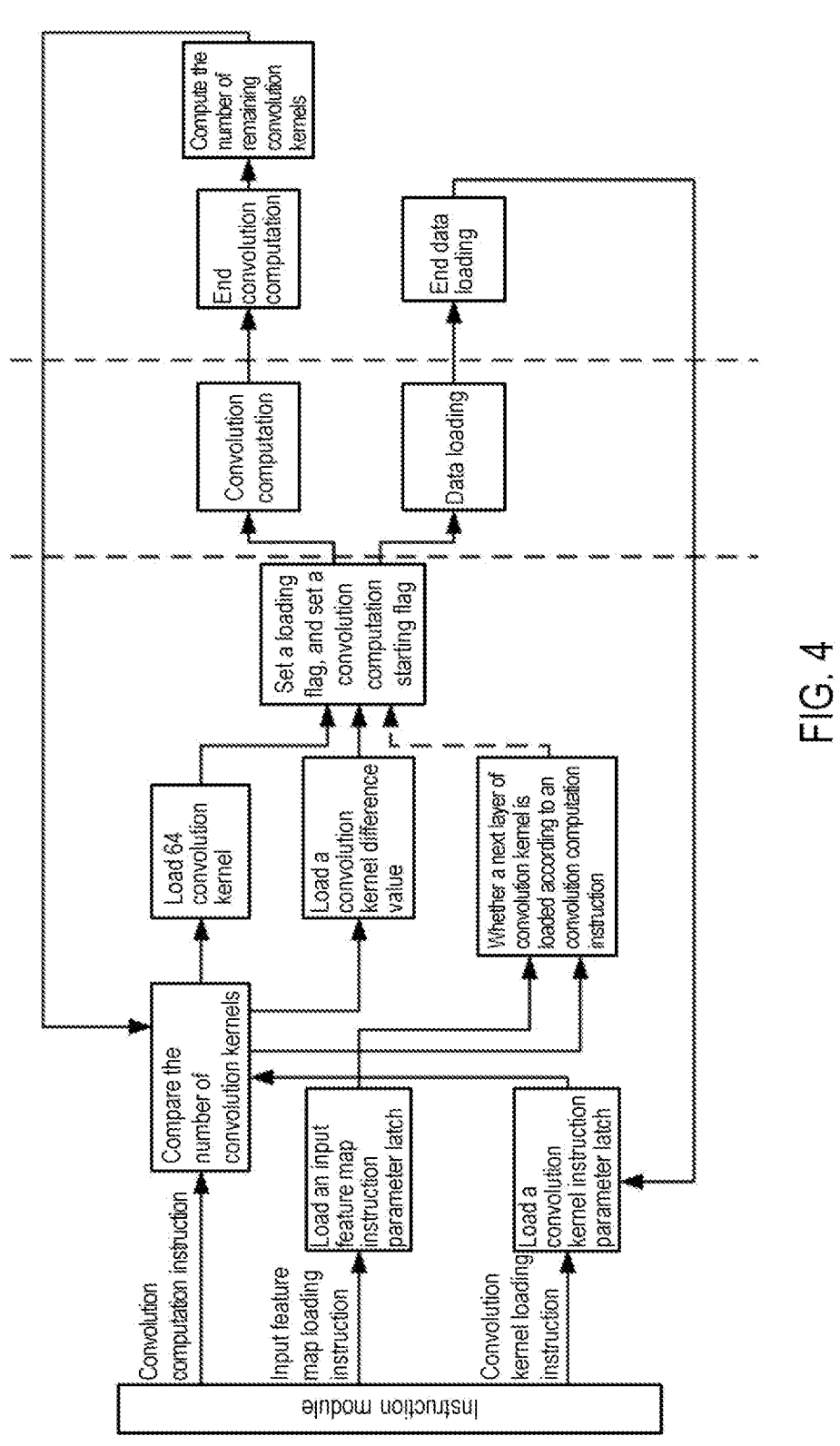
FIG. 4 is a parallel block diagram of convolution computation and convolution kernel data loading of a neural network accelerator in the present disclosure.

Step 3, execute convolution computation, put a result into the output feature map cache, and simultaneously storing a next group of 64 convolution kernels into another convolution kernel cache, which is at the core of the present disclosure, and as shown in FIG. 4, is divided into the following sub-steps:

1) load an input feature map instruction parameter latch and a convolution kernel instruction parameter latch. When a neural network accelerator is started, instructions are sequentially read from an instruction module, and if a current instruction is an input feature map loading instruction, an off-chip input feature map storage address is latched, and an input feature map length is loaded; and if the current instruction is a convolution kernel loading instruction, the number of currently loaded convolution kernels, lengths of the loaded convolution kernels, a convolution kernel cache starting address, an off-chip convolution kernel storage address, etc. are required to be latched.

2) compare the number of the convolution kernels. The total number of the convolution kernels in a convolution computation instruction is compared with a latch value of the number of the loaded convolution kernels, if the total number of the convolution kernels in the convolution computation instruction is greater than the loaded convolution kernel instruction parameter latch value and is an integral multiple of 64 (greater than 1), the number of the channels of the convolution kernels loaded by simultaneously computing convolution is 64, and if the total number of the convolution kernels in the convolution computation instruction is greater than the loaded convolution kernel instruction parameter latch value and is 1 multiple of 64, the number of the channels of the convolution kernels loaded by simultaneously computing convolution is a difference value between the total number of the convolution kernels in the convolution computation instruction and the latch value of the number of the loaded convolution kernels; and if the total number of the convolution kernels in the convolution computation instruction is equal to the loaded convolution kernel instruction parameter latch value, whether to load convolution kernels in the next layer is determined according to setting of parameters of the loaded convolution kernels in the next layer in the convolution computation instruction.

3) set a loading flag, and set a convolution computation starting flag at the same time. According to a comparison result of the number of the convolution kernels, the loading flag is set, and represents that data is specifically loaded into which convolution kernel cache. Moreover, the convolution computation starting flag is set.

4) carry out convolution computation and data loading. The two operations are completely independent of each other and are synchronously carried out in parallel.

Figure 5:
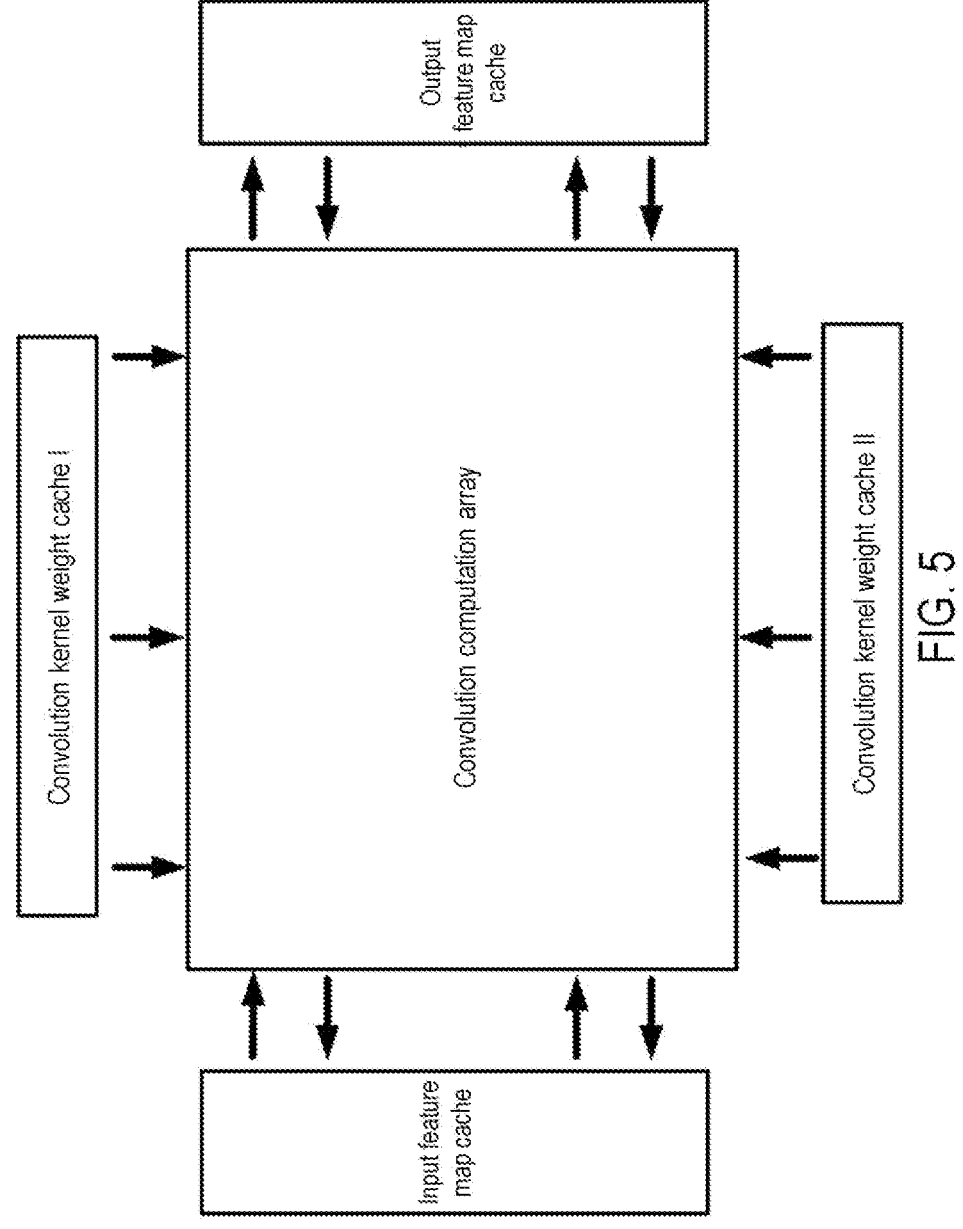
FIG. 5 is a block diagram of convolution computation of the neural network accelerator in the present disclosure.

As shown in FIG. 5, each part of convolution computation includes an input feature map cache, an output feature map cache, a first convolution kernel weight cache, a second convolution kernel weight cache and a convolution computation array.

The input feature map cache and the output feature map cache are consistent in structure, stores feature maps according to channels, and store 64 channels into different cache sub-blocks. The first convolution kernel weight cache and the second convolution kernel weight cache are consistent in structure, and sequentially store required convolution kernel weights into the convolution kernel cache sub-blocks in order. In one embodiment of the present disclosure, the convolution computation array is composed of a 64×64 two-dimensional array, the weights are transmitted down, and the input feature maps are transmitted to the right.

5) compute the number of remaining convolution kernels after convolution computation and data loading are completed. When a convolution computation completion flag and a data loading completion flag are valid at the same time, the number of the remaining convolution kernels is computed. Moreover, each convolution kernel data loading parameter in sub-step 4 is latched, and sub-step 2 is returned to continue being executed until convolution computation is completed.

Step 4, after convolution computation of the layer is completed, interchange the input feature map cache and the output feature map cache, and use another convolution kernel cache as a weight input to continue convolution computation.

Which convolution kernel cache stores an effective weight is reasoned according to the number of convolution kernels of each of convolution layers and initial storage positions of the convolution kernels, and may be directly given by means of fields in the convolution computation instruction. If the initial storage positions of the convolution kernels in step 2 are a first convolution kernel cache module, if the total number of the convolution kernels is within 64, a second convolution kernel cache module is used for next convolution computation, if the number of the convolution kernels is an even multiple of 64, the first convolution kernel cache module is used for next convolution computation, and if the number of the convolution kernels is an odd multiple of 64, the second convolution kernel cache module is used for next convolution computation. If the number of the convolution kernels is neither an even multiple of 64 nor an odd multiple of 64, the number of the convolution kernels is divided by 64 to round up to an integer.

Step 5, load a next frame of input feature map according to setting of an instruction register after all convolution computation is completed; and load the next frame of input feature map according to the setting of the instruction register when the last convolution computation is executed.

The above-mentioned embodiments are merely intended for describing the technical solutions of the present disclosure rather than limiting the present disclosure. Although the present disclosure is described in detail with reference to the above-mentioned embodiments, those of ordinary skill in the art should understand that they may still make modifications to the technical solutions described in the embodiments or equivalent substitutions to some or all of the technical features of the technical solutions. These modifications or substitutions do not enable the corresponding technical solutions to depart from the scope of the technical solutions in the embodiments of the present disclosure.

What is claimed is:

1. A parallel method for convolution computation and data loading of a neural network accelerator, comprising:

S1: storing a frame of input feature maps into an input feature map cache, and dispersedly storing the input feature maps into input feature map sub-caches according to channels of the input feature maps;

S2: sequentially loading a group of convolution kernels into corresponding convolution kernel cache sub-blocks in a first convolution kernel cache;

S3: loading the input feature map cache and the first convolution kernel cache to execute convolution computation, putting a result into an output feature map cache, and storing a next group of convolution kernels into corresponding convolution kernel cache sub-blocks in a second convolution kernel cache, which comprises:

S31: loading an input feature map instruction parameter latch, loading a convolution kernel instruction parameter latch, and under the condition that a current instruction is an input feature map loading instruction, latching an off-chip input feature map storage address and loading an input feature map length; and latching the number of currently loaded convolution kernels, lengths of the loaded convolution kernels, a convolution kernel cache starting address and an off-chip convolution kernel storage address under the condition that the current instruction is a convolution kernel loading instruction;

S32: comparing the number of the convolution kernels, and under the condition that the total number of the convolution kernels is greater than a latch value of the number of the loaded convolution kernels and is an integer multiple, greater than 1 multiple of the number of the loaded convolution kernels in a convolution computation instruction, computing convolution and synchronously loading convolution kernels, the number of channels of the convolution kernels being the number of the loaded convolution kernels; under the condition that the total number of the convolution kernels is greater than the latch value of the number of the loaded convolution kernels and is 1 multiple of the number of the loaded convolution kernels in the convolution computation instruction, computing convolution and synchronously loading convolution kernels, the number of channels of the convolution kernels being a difference value between the total number of the convolution kernels and the latch value of the number of the loaded convolution kernels; and under the condition that the total number of the convolution kernels is equal to the latch value of the number of the loaded convolution kernels in the convolution computation instruction, determining whether to load convolution kernels in the next layer according to setting in the convolution computation instruction; and S33: setting a loading flag according to a comparison result of the number of the convolution kernels, the loading lag representing that data is specifically loaded into which convolution kernel cache, and setting a convolution computation starting flag;

S34: synchronously carrying out convolution computation and data loading which are independent of each other; and S35: computing the number of remaining convolution kernels after convolution computation and data loading are completed, latching data loading parameters of the convolution kernels in S34, and returning to S32 to continue being executed until convolution computation is completed;

S4: after convolution computation of the layer is completed, interchanging the input feature map cache and the output feature map cache, and using a convolution kernel cache storing an effective weight as the first convolution kernel cache to execute S3, wherein the effective weight is stored into the convolution kernel cache and is directly given by means of fields in the convolution computation instruction in S4; and S5: determining that all convolution computation is completed.

2. The parallel method for convolution computation and data loading of a neural network accelerator according to claim 1, wherein the number of the remaining convolution kernels is computed after a convolution computation completion flag and a data loading completion flag are valid at the same time in S35.

3. The parallel method for convolution computation and data loading of a neural network accelerator according to claim 1, wherein in S4, the effective weight is stored into the convolution kernel cache, which convolution kernel cache stores the effective weight is determined according to the number of the convolution kernels of each of convolution layers and initial storage positions of the convolution kernels, which comprises:

S41: under the condition that the initial storage positions of the convolution kernels in S2 are set as the first convolution kernel cache;

S42: using the second convolution kernel cache for next convolution computation under the condition that the total number of the convolution kernels is within the number of columns of a convolution computation array;

S43: using the first convolution kernel cache for next convolution computation under the condition that the total number of the convolution kernels is an even multiple of the number of columns of the convolution computation array;

S44: using the second convolution kernel cache for next convolution computation under the condition that the total number of the convolution kernels is an odd multiple of the number of columns of the convolution computation array; and S45: dividing the total number of the convolution kernels by the number of columns of the convolution computation array to round up to an integer under the condition that the total number of the convolution kernels is not the even multiple or the odd multiple of the number of columns of the convolution computation array, the initial storage positions are the second convolution kernel cache, the steps being the same, and a result being opposite.

4. The parallel method for convolution computation and data loading of a neural network accelerator according to claim 1, wherein the channels of the input feature maps are sequentially and circularly stored into sequences corresponding to sub-caches in order in S1.

5. The parallel method for convolution computation and data loading of a neural network accelerator according to claim 1, wherein the sub-cache is expanded to make the plurality of sub-caches store one channel when a single feature map sub-cache is not enough to store a feature map of a single channel in S1.

6. The parallel method for convolution computation and data loading of a neural network accelerator according to claim 1, wherein lengths of the convolution kernel cache sub-blocks are $W \times H \times C$ in S2, W representing widths of the convolution kernels, H representing heights of the convolution kernels, and C representing the number of the channels of each of the input feature maps.

7. The parallel method for convolution computation and data loading of a neural network accelerator according to claim 1, wherein a next frame of input feature map is loaded or convolution kernels in the next layer are loaded after all convolution computation is completed in S5.

8. A parallel device for convolution computation and data loading of a neural network accelerator, comprising:

a convolution computation array;

an input feature map cache;

an output feature map cache; and a convolution kernel cache, which are each connected to the convolution computation array, wherein the convolution kernel cache comprises:

a first convolution kernel cache; and a second convolution kernel cache, wherein the input feature map cache and the output feature map cache are consistent in structure, and a frame of input feature maps is stored into the input feature map cache, and are dispersedly stored into input feature map sub-caches according to channels of the input feature maps;

the first convolution kernel cache and the second convolution kernel cache are consistent in structure, and a group of convolution kernels are sequentially loaded into corresponding convolution kernel cache sub-blocks in the first convolution kernel cache; and the convolution computation array is composed of a two-dimensional array, the input feature map cache and the first convolution kernel cache are loaded to execute convolution computation, a result is put into the output feature map cache, and moreover, a next group of convolution kernels are stored into corresponding convolution kernel cache sub-blocks in the second convolution kernel cache; and after convolution computation of the layer is completed, the input feature map cache and the output feature map cache are interchanged, and a convolution kernel cache storing an effective weight is used as the first convolution kernel cache to continue convolution computation until all convolution computation is completed.

* * * * *